United States Patent
Järvelä et al.

[11] Patent Number: 5,917,851
[45] Date of Patent: Jun. 29, 1999

[54] METHOD FOR ALLOCATING RAKE BRANCHES AND RAKE RECEIVER

[75] Inventors: Mikko Järvelä, Oulu; Lauri Ståhle, Valkeakoski, both of Finland

[73] Assignee: Nokia Telecommunications Oy, Espoo, Finland

[21] Appl. No.: 08/774,645

[22] Filed: Dec. 30, 1996

[51] Int. Cl.[6] .............................. H03B 15/00; H04K 1/00; H04L 27/30

[52] U.S. Cl. ...................... 375/200; 375/347; 370/320; 455/277.2; 455/273

[58] Field of Search ................................. 375/200, 208, 375/316, 340, 343, 347; 370/335, 342, 320, 319, 441; 455/272, 277.2, 273, 275, 276.1, 278.1

[56] References Cited

U.S. PATENT DOCUMENTS

| | | | |
|---|---|---|---|
| 5,499,397 | 3/1996 | Wadin et al. | 455/277.2 |
| 5,654,980 | 8/1997 | Latva-aho et al. | 375/208 |
| 5,692,019 | 11/1997 | Chang et al. | 455/277.2 |
| 5,740,526 | 4/1998 | Bonta et al. | 455/277.2 |

FOREIGN PATENT DOCUMENTS

WO 94/13085   6/1994   WIPO.

*Primary Examiner*—Chi H. Pham
*Assistant Examiner*—Bryan Webster
*Attorney, Agent, or Firm*—Pillsbury Madison & Sutro LLP

[57] ABSTRACT

The present invention relates to a method for allocating RAKE branches and a RAKE receiver. The solution is used in a radio system where a transmitter transmits a signal to a receiver comprising RAKE branches which receive the signal at different polarization levels. The RAKE branches are allocated to receive the signal on the basis of an impulse response, and in which method the impulse responses of the signals received at different polarization levels are weighted by values describing signal quality for optimizing allocation.

14 Claims, 1 Drawing Sheet

METHOD FOR ALLOCATING RAKE BRANCHES AND RAKE RECEIVER

BACKGROUND OF THE INVENTION

1. Field of the Invention

The present invention relates to the CDMA method (Code Division Multiple Access) used in radio systems and more exactly to allocation of a RAKE receiver when using polarization diversity.

2. Description of Related Art

A receiver operating on a RAKE principle comprises several branches, each of which may be synchronized with a different signal component at the same time. A RAKE receiver preferably operates as a diversity combiner of multipath propagated signals. RAKE receivers are used especially in CDMA receivers.

In a CDMA method, a narrow-band data signal of a user is multiplied by a spreading code having a considerably broader band than the data signal. Users transmit by using the same frequency band simultaneously. A separate spreading code is used over each connection between a base station and a mobile station, and the signals of the users can be distinguished from one another in the receivers on the basis of the spreading code of each user. The spreading codes are preferably selected in such a way that they correlate with each other as little as possible. The signals multiplied by some other spreading code do not correlate in an ideal case and are not restored to the narrow band, but they will appear as noise.

In prior art, especially in a base station of a radio system, space diversity is used between RAKE branches. This means that antennas of different diversity branches are placed at some distance from each other. The distance is generally several tens of wavelengths. The purpose of this is to make the correlation of the signals received by different antennas sufficiently small. Typically, correlation is at a rate of 0.7. As correlation is rather high, during fading, the signal of all the branches will be significantly reduced and in the worst case the signal is lost, irrespective of diversity and the connection is broken down.

The use of polarization diversity in RAKE receivers is also well known. In polarization diversity, RAKE branches receive a signal at different polarization levels. In a prior art solution, impulse response measurement is used for allocating RAKE branches that use polarization diversity. In that case, signals with the strongest impulse response are received, combined and detected at different RAKE branches. This method is best suited for a case in which the signal levels of diversity branches are equal. As this is not generally the case when using polarization diversity, this method is not optimal.

SUMMARY OF THE INVENTION

The object of the present method and RAKE receiver is to realize a more effective allocation of RAKE branches using polarization diversity on the basis of the characteristics of the signals.

The objects of the invention are provided by using a method for allocating RAKE branches in a radio system in which a transmitter transmits a signal to a receiver comprising RAKE branches which receive the signal at different polarization levels. The RAKE branches are allocated to receive the signal on the basis of an impulse response. The impulse responses of the signals received at different polarization levels are weighted by values describing signal quality for optimizing allocation.

The objects of the invention are also attained by using a RAKE receiver which is adapted to be used in a radio system in which a transmitter transmits a signal to a receiver comprising RAKE branches which are adapted to receive the signal at different polarization levels. The RAKE branches are allocated to receive the signal on the basis of an impulse response. The receiver further comprises: means for forming an impulse response of the signal at different polarization levels; means for forming a value describing signal quality at different polarization levels; means for weighting the impulse response by a value describing signal quality for optimizing allocation.

Considerable advantages are provided with the method of the invention. The method enables a more effective allocation of RAKE branches than prior art because the signals, which are the most optimal at their strength and signal noise ratio, are selected for detection. In a typical solution, a limited number of RAKE branches can be allocated to one traffic channel, the branches being divisible between diversity branches.

DESCRIPTION OF THE DRAWINGS

In the following, the invention will be described in more detail with reference to the examples of the accompanying drawings, where.

DESCRIPTION OF THE PREFERRED EMBODIMENTS

The solution of the invention is suitable for use in a CDMA radio system without being restricted thereto.

Figure 1:
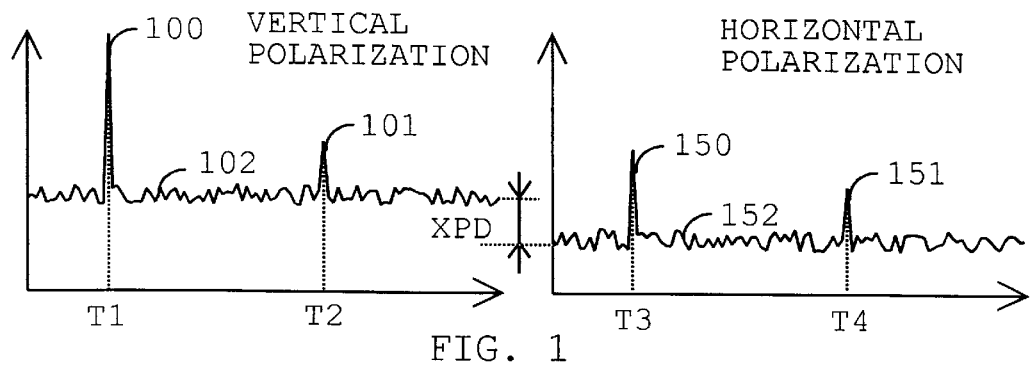
FIG. 1 shows the received signals at two different polarization levels.

FIG. 1 illustrates the behavior of a signal and noise at different polarization levels, which are indicated by vertical polarization and horizontal polarization. The energy of the signal and the noise is shown on a y-axis and a delay is shown on an x-axis. As the signal is multipath propagated, a strong impulse peak 100 with delay $T_1$ and another peak 101 with delay $T_2$ can be seen in the signal. The level of noise 102, i.e. interference level, is, however, rather high on vertical polarization. On horizontal polarization, the signal also has a strong peak 150, at point $T_3$, and another peak 151 at point $T_4$. On horizontal polarization, noise 152 is weaker than on vertical polarization. This difference of signal levels between horizontal and vertical polarizations is referred to as Cross Polarization Discrimination (XPD). Therefore Signal Noise Ratio (SNR) of a signal received on horizontal polarization is better than that of a signal received on vertical polarization, although the impulse response of a signal received on vertical polarization, and thus the signal, too, are stronger than those on horizontal polarization. A typical correlation of signals received at orthogonal polarization levels, such as horizontal and vertical polarization is of a rate of 0.1 to 0.2, which is a great deal smaller than when using space diversity. Orthogonal discrimination will be made between the polarization levels when the reception takes place at polarization levels whose normals are at an angle of 90° with respect to one another. At other angles the correlation will diminish fast as, theoretically, the effect of different polarization levels to one another is typically of form $P_H = P_v * \cos^2(\alpha)$, where $P_H$ is the effective value of the signal at horizontal level, $P_V$ is the effective value of the signal at vertical level and α is the angle between the normals of the polarization levels.

In the method of the invention, the transmitter transmits a signal to a receiver comprising RAKE branches. The receiver receives the signal at different polarization levels. The polarization levels are preferably orthogonal, such as vertical and horizontal polarization. In the method, the impulse responses of signals received at different polarization levels are weighted by values describing the signal quality of each polarization level for optimizing allocation. Weighting is preferably performed by multiplying the impulse response by a value describing signal quality. The value is preferably a signal noise ratio or a signal interference ratio or the like. Because the number of RAKE branches in a receiver is limited, typically 3 to 4 branches, it is important to allocate the RAKE branches optimally to the received signal components so that the received signal noise ratio or the like would be optimum.

Figure 2:
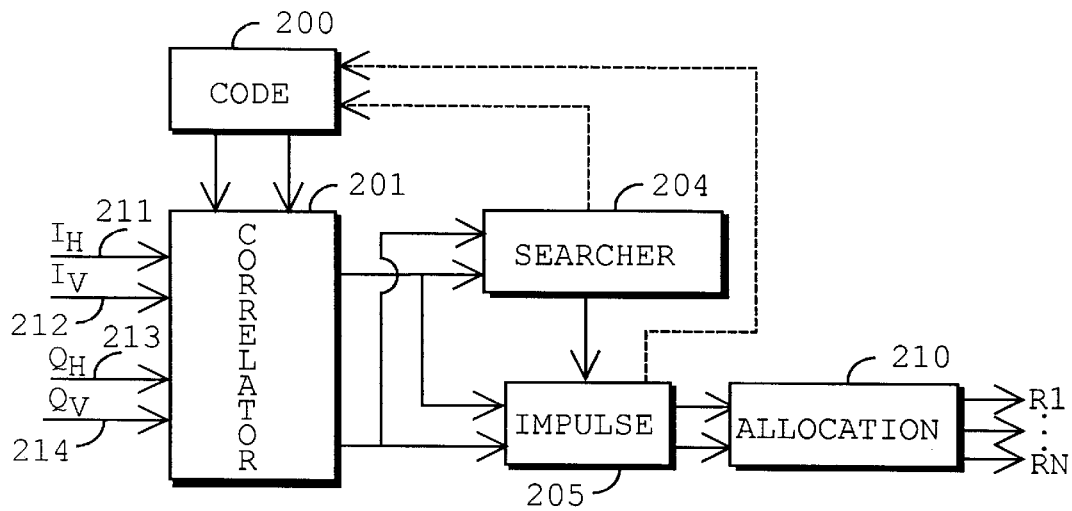
FIG. 2 shows a block diagram of the prior art receiver.

FIG. 2 shows a block diagram of a prior art receiver. The receiver comprises a code generator 200, a correlator 201, a searcher 204, means 205 for forming impulse responses of signals and means 210 for allocating RAKE branches. The data of different polarization levels 211, 212 and 213, 214 of the received signals typically comprises two known components: I and Q components (inphase and quadrature phase), such that data is generally processed in complex form I+jQ. In the receiver the correlator 201 forms correlation with the received signal 213 to 214 and the spreading code from the code generator 200. The code phase, i.e. the delay of each multipath-propagated signal component formed in the searcher 204 is searched by means of correlation.

The delays of the multipath-propagated signal may be preferably determined from the correlation of the received signal and spreading code as the maximum points of correlation represent delays of different paths. The delays and correlation can be, however, determined by other known methods. Correlation C[τ] can be calculated for example with formula $$C[\tau] = \int_a^b S[t] \cdot M[t + \tau] dt, \quad (1)$$

where a and b represent the integration interval, S[t] is the received signal and M[t+τ] comprises the spreading code with delay τ.

Synchronization to an incoming signal generally takes place in two phases. In the search of the code phase, the required signal is to be searched from the received transmission and its phase is to be determined at an accuracy of half a chip. The chip is one bit of the spreading code. When this is attained, the phase is considered locked, after which the phase of the code is finely adjusted by a code tracking loop which makes sure phase locking is retained. In the means 205 the impulse responses of the signals are formed in a manner known to persons skilled in the art by using the correlation result from the correlator 201 and the code phase data from the searcher 204. The allocation of RAKE branches is controlled in the means 210 on the basis of impulse response data.

Figure 3:
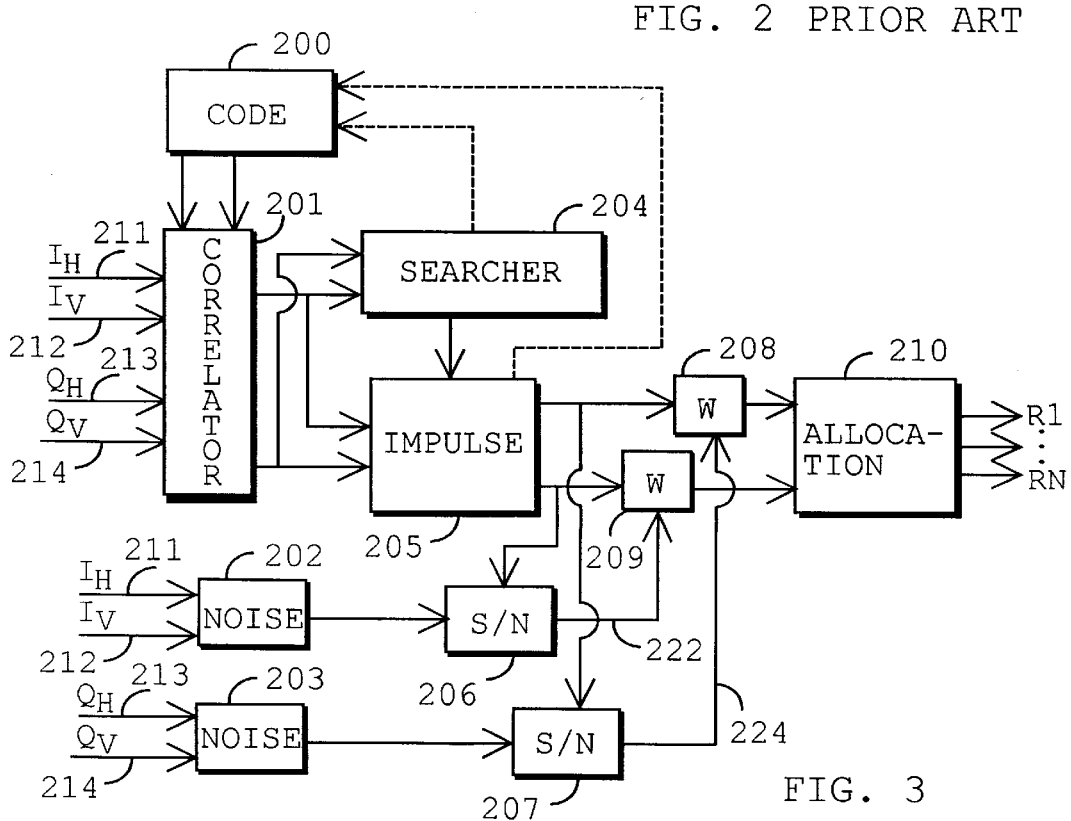
FIG. 3 shows a block diagram of the receiver of the invention.

FIG. 3 shows a block diagram of a receiver of the invention which operates by the method of the invention. The receiver comprises a code generator 200, a correlator 201, means 202 and 203 for forming interference strength, a searcher 204, means 205 for forming impulse responses of signals, means 206 and 207 for forming a value describing signal quality, means 208 and 209 for weighting the impulse response and means 210 for allocating RAKE branches. In the receiver the correlator 201 forms correlation with the received signal 211 to 214 and the spreading code from the code generator 200. The code phase, i.e. the delay of each multipath-propagated signal component formed in the searcher 204 is searched by means of correlation.

In the solution of the invention, the received signals 211 to 214 will also enter the means 202 and 203 where the strength of interference is formed preferably as an effective value. The means 206 and 207 will derive interference strength from interference means 202 and 203 and signal strength from impulse means 205, whereby the means 206 and 207 form a value describing signal quality. This value describing signal quality is signal interference ratio where noise and interference from other signals are preferably taken into consideration. The interference level is determined in the means 202 and 203 for example by correlating the received signal by an incorrect spreading code or by using the phase of an incorrect spreading code. This result is preferably averaged in a long interval, whereby the average level of interference will be obtained. The value describing signal quality is formed for example by dividing the correlation results of the pins of the impulse response by the interference level from the means 202 and 203. It is also possible to divide the average of the correlation result by standard deviation or variance because the dependence of the signal and interference may be linear or non-linear. In the RAKE receiver of the invention this signal interference ratio 222 and 224, of preferably both orthogonal polarization level is used to weight the impulse response result from the means 205 in the means 208 and 209. This is carried out separately for both impulse response results of the polarization level. The allocation of RAKE branches $R_1, R_2 \ldots R_N$ is controlled in the means 210 with a weighted impulse response result from the means 208 and 209. In that case each RAKE branch receives a signal at the selected delay and polarization level.

Although the invention has been explained above with reference to the examples of the accompanying drawings, it is evident that the invention is not restricted thereto but it can be modified in many ways within the scope of the inventive idea disclosed in the appended claims.

We claim:

1. A method for allocating a plurality of RAKE branches in a radio system, the method comprising:

allocating the RAKE branches to receive a plurality of transmitted signals based on a plurality of impulse responses;

receiving, at the RAKE branches of a receiver, the signals at different polarization levels; and weighting the impulse responses of the signals received at the different polarization levels by a plurality of values describing a signal quality for optimizing the allocating.

2. A RAKE receiver adapted to be used in a radio system in which a transmitter transmits a signal to the RAKE receiver, the RAKE receiver comprising:

a plurality of RAKE branches adapted to receive the signal at different polarization levels, and being allocated to receive the signal based on an impulse response;

means for forming the impulse response of the signal at the different polarization levels;

means for forming a value describing signal quality at the different polarization levels; and means for weighting the impulse response by the value describing the signal quality for optimizing allocation.

3. A method according to claim 1, wherein weighting comprises multiplying an impulse response of a corresponding one of the signals by a corresponding one of the values describing signal quality.

4. A method according to claim 1, wherein an interference level of the signals received at the different polarization levels forms the values describing the signal quality.

5. A method according to claim 1, wherein each of the values describing the signal quality is a ratio of a corresponding signal strength and a corresponding interference strength.

6. A method according to claim 1, wherein the different polarization levels are two substantially orthogonal polarization levels.

7. A RAKE receiver according to claim 2, wherein the means for weighting the impulse response is adapted to multiply the impulse response by the value describing signal quality.

8. A RAKE receiver according to claim 2, further comprising means for forming an interference level of the signal received at the different polarization levels for the value describing the signal quality.

9. A RAKE receiver according to claim 2, wherein the means for forming the value describing the signal quality is adapted to form a ratio of a signal strength and an interference strength.

10. A RAKE receiver according to claim 2, wherein the RAKE branches are adapted to receive the signal at two substantially orthogonal polarization levels.

11. A method according to claim 5, wherein each of the values describing the signal quality is a signal noise ratio.

12. A method according to claim 5, wherein each of the values describing the signal quality is a signal interference ratio.

13. A RAKE receiver according to claim 9, wherein the means for forming the value describing the signal quality forms a signal noise ratio.

14. A RAKE receiver according to claim 9, wherein the means for forming the value describing the signal quality forms an interference ratio.

* * * * *